United States Patent
Holtkamp, Jr. et al.

(10) Patent No.: US 11,026,377 B2
(45) Date of Patent: Jun. 8, 2021

(54) WICK WATERING POT COVER SYSTEM

(71) Applicants: Reinhold H. Holtkamp, Jr., Brentwood, TN (US); Lawrence P. Holtkamp, Nashville, TN (US)

(72) Inventors: Reinhold H. Holtkamp, Jr., Brentwood, TN (US); Lawrence P. Holtkamp, Nashville, TN (US)

( * ) Notice: Subject to any disclaimer, the term of this patent is extended or adjusted under 35 U.S.C. 154(b) by 509 days.

(21) Appl. No.: 15/409,036

(22) Filed: Jan. 18, 2017

(65) Prior Publication Data

US 2017/0202160 A1    Jul. 20, 2017

Related U.S. Application Data

(60) Provisional application No. 62/280,392, filed on Jan. 19, 2016.

(51) Int. Cl.
*A01G 27/04*    (2006.01)
*A01G 22/00*    (2018.01)
*A01G 9/04*    (2006.01)

(52) U.S. Cl.
CPC ............. *A01G 27/04* (2013.01); *A01G 22/00* (2018.02); *A01G 9/045* (2013.01)

(58) Field of Classification Search
CPC ........ A01G 27/04; A01G 27/02; A01G 27/06; A01G 27/00; A01G 22/00; A01G 9/045
See application file for complete search history.

(56) References Cited

U.S. PATENT DOCUMENTS

| 1,342,786 | A | | 6/1920 | White | |
|---|---|---|---|---|---|
| 2,691,245 | A | * | 10/1954 | Yohe | A47G 7/041 47/81 |
| 3,557,490 | A | * | 1/1971 | Delaney | A01G 27/06 47/81 |
| 3,866,351 | A | * | 2/1975 | Cobia | A01G 9/04 47/81 |
| 3,879,889 | A | * | 4/1975 | Schmid | A01G 9/02 47/60 |

(Continued)

FOREIGN PATENT DOCUMENTS

| DE | 3440616 A1 * | 5/1986 | ............ A01G 27/04 |
|---|---|---|---|
| GB | 2 035 028 | 6/1980 | |

(Continued)

*Primary Examiner* — Kathleen I Alker
(74) *Attorney, Agent, or Firm* — Richard Malagiere, Esq.

(57) ABSTRACT

An inexpensive wick watering system for potted plants and flowers is disclosed. An inner grower pot containing a plant/flower and soil has holes in its bottom surface along with a central indentation. The outer decorative pot into which the inner pot is inserted has a central protrusion which accepts the central indentation of the inner grower pot and a hole inserted into the center. A Wicking insert is inserted into the bottom of the outer decorative pot before inserting the inner grower pot with holes in its bottom surface. This wicking insert works to transfer water sitting in the volume created between the inner grower pot and the outer decorative pot when the inner grower pot is placed inside the outer decorative pot due to the soil's natural ability to be infiltrated and naturally hydrated by the water. Water that rises up to the hole in the center portion of the outer pot central protrusion drains from the outer pot.

8 Claims, 12 Drawing Sheets

(56) References Cited

U.S. PATENT DOCUMENTS

| | | | |
|---|---|---|---|
| 4,096,663 A | 6/1978 | Silver | |
| 4,265,050 A | 5/1981 | Buescher | |
| 4,271,630 A * | 6/1981 | Zeltner | A01G 27/04 47/79 |
| 4,434,577 A * | 3/1984 | Holtkamp | A01G 27/04 47/67 |
| 4,539,038 A * | 9/1985 | Gombert | A01G 9/00 71/64.11 |
| 4,684,013 A | 4/1987 | Jacobs | |
| 4,829,709 A * | 5/1989 | Centafanti | A01G 27/04 47/79 |
| 4,908,986 A * | 3/1990 | Rowland | A01G 27/04 47/64 |
| 4,932,159 A * | 6/1990 | Holtkamp, Sr. | A01G 27/04 47/81 |
| 4,965,963 A | 10/1990 | Lyon | |
| 5,058,319 A * | 10/1991 | Liao | A01G 27/04 47/79 |
| 5,107,621 A | 4/1992 | Deutschmann, Sr. | |
| 5,136,806 A * | 8/1992 | Kang | A01G 27/04 47/65.5 |
| 5,277,877 A * | 1/1994 | Jeffrey | A61L 9/122 47/66.6 |
| 5,279,070 A * | 1/1994 | Shreckhise | A47G 7/025 47/39 |
| 5,644,868 A * | 7/1997 | Lui | A01G 27/06 47/79 |
| 5,722,201 A | 3/1998 | Diorio et al. | |
| 5,806,242 A * | 9/1998 | Park | A01G 9/16 47/81 |
| 5,860,249 A | 1/1999 | Holtkamp, Jr. | |
| 6,070,360 A * | 6/2000 | Liao | A01G 27/02 47/65.5 |
| 6,079,156 A * | 6/2000 | Colovic | A01G 27/04 47/81 |
| 6,226,921 B1 * | 5/2001 | Kang | A01G 27/06 47/81 |
| 7,082,717 B1 * | 8/2006 | Wang | A01G 27/008 47/79 |
| 7,171,783 B1 * | 2/2007 | Fidotti | A01G 27/04 47/81 |
| 10,362,736 B2 * | 7/2019 | Visser | A01G 9/143 |
| 2004/0237403 A1 * | 12/2004 | Sekiya | A01G 27/06 47/81 |
| 2006/0112634 A1 | 6/2006 | Vogt | |
| 2009/0223124 A1 | 9/2009 | Pasquariello et al. | |
| 2009/0266438 A1 * | 10/2009 | Masuda | A01G 27/04 139/387 R |
| 2016/0120139 A1 * | 5/2016 | Lee | A01G 27/06 47/81 |

FOREIGN PATENT DOCUMENTS

| | | |
|---|---|---|
| GB | 1581228 | 12/1980 |
| GB | 2124463 | 2/1984 |
| GB | 2139064 | 11/1984 |
| WO | WO 03/043408 | 5/2003 |
| WO | WO-03034808 A1 * | 5/2003 ............ A01G 27/06 |

* cited by examiner

WICK WATERING POT COVER SYSTEM

PRIORITY

The Application claims priority to Provisional Patent application 62/280,392 filed Jan. 19, 2016.

BACKGROUND OF INVENTION

The present invention is directed to a new and innovative low cost wick watering plant moisture maintenance system for potted plants. The traditional plant moisture maintenance systems most often employed by retailers are functional but expensive. So much so that the traditional plant moisture maintenance systems are often more expensive then the plants they are designed to care for.

Most often potted plants are either sold in their plain grower pot or in a decorative pot cover. These decorative pot covers are either soft or hard and primarily serve the purpose of covering up the dirty grower pot with a decorative pot. These traditional pot covers also are designed to trap excess water to prevent it from flowing on the floor.

The present invention incorporates design modifications to a typical plastic decorative pot cover designed to accept an inexpensive wicking insert placed in its base. A modified popular grower pot designed to take advantage of the modified pot cover is inserted into the pot cover with the wicking insert already placed inside the decorative pot cover. The incorporation of the present invention allows the grower to add true value and a great benefit to its product without the cost associated with the traditional more expensive plant moisture maintenance systems.

Additionally, caring for plants at the retail level while using the present wick watering system greatly reduces the loss also referred to as shrinkage of the inventory of the plants being sold. Traditionally, the retail channel would lose a significant margin of plants due to over or under watering. To avoid this shrinkage, the retailer would have to expend labor cost to ensure proper watering of the potted plants; or incorporate an expensive traditional wick watering maintenance system into its operation; or simply incorporate the shrinkage into its retail price. The result of implementing any of these measures translates into higher retail prices to the consumer.

The advantage of the instant invention is that the benefits of wick watering are provided at a marginal cost that drastically reduces shrinkage of potted plant inventory. This allows the retailer to either offer a lower retail price point or improve its net profit margin.

BRIEF SUMMARY OF INVENTION

The present invention is directed to a plant potting system wherein the inner grower pot containing the plant/flower and soil has holes in its bottom surface along with a central indentation. The outer decorative pot into which the inner pot is inserted has a central protrusion which accepts the central indentation of the inner grower pot. Wicking inserts are inserted into the bottom of the outer decorative pot before inserting the inner grower pot. These wicking inserts work to transfer water sitting in the volume created between the inner grower pot and the outer decorative pot when the inner grower pot is placed inside the outer decorative pot.

The prior art discloses several designs to transfer water to plants; none of which discloses the instant invention. Specifically, placing a grower pot with a hole in the bottom center on a base container filled with water. This base container has a submerged sponge which is in contact with a disk like mat located on the top of the base container on which the grower pot sits. Alternatively, the prior art teaches the above arrangement with a mat of "capillary" material laid on the support means (between the reservoir and the grower pot) with at least one edge of the "capillary" material inserted into the base container filled with water.

In another embodiment of prior art, a grower pot with a hole in the center is placed on top of a base pot filled with water with rigid members elevating the grower pot above the bottom of the base pot. Here, a wick is inserted into the base pot filled with water which is in contact with the hole on the bottom of the grower pot. In yet another embodiment of prior art, a grower pot is placed on top of a base pot filled with water with rigid members elevating the grower pot above the bottom of the base pot. Here, a wick is inserted into the base pot filled with water which is in contact with a hole punched through the side of the grower pot.

The present wick watering system discloses a self-regulating water level base container and grower pot system featuring communicating base geometry with a wicking insert placed between them. Specifically, and distinct from the prior art teachings, the present invention allows for the indiscriminate placement of the wicking insert into the base pot and contemplates and allows for overwatering of the plant in the grower pot.

DRAWINGS

Figure 6A:
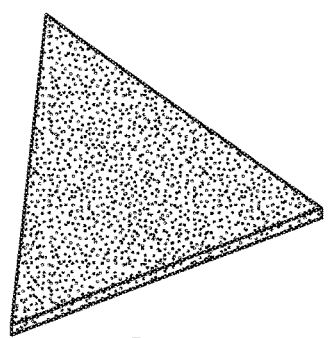
Figure 6B:
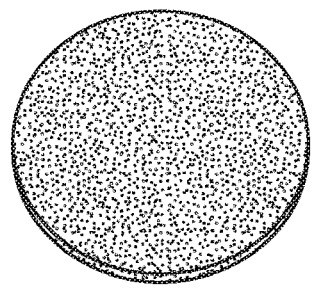
Figure 6C:
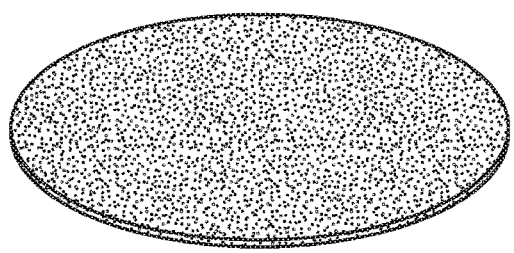
Figure 6D:
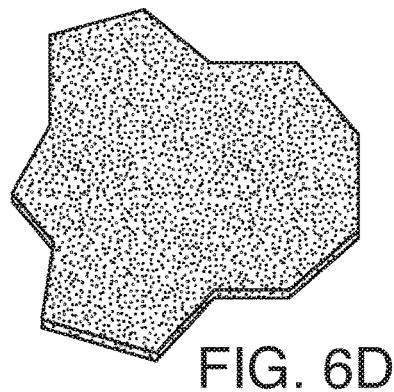

FIG. 6A is a top view of a wicking element.
FIG. 6B is a top view of a wicking element.
FIG. 6C is a top view of a wicking element.
FIG. 6D is a top view of a wicking element.

Figure 7:
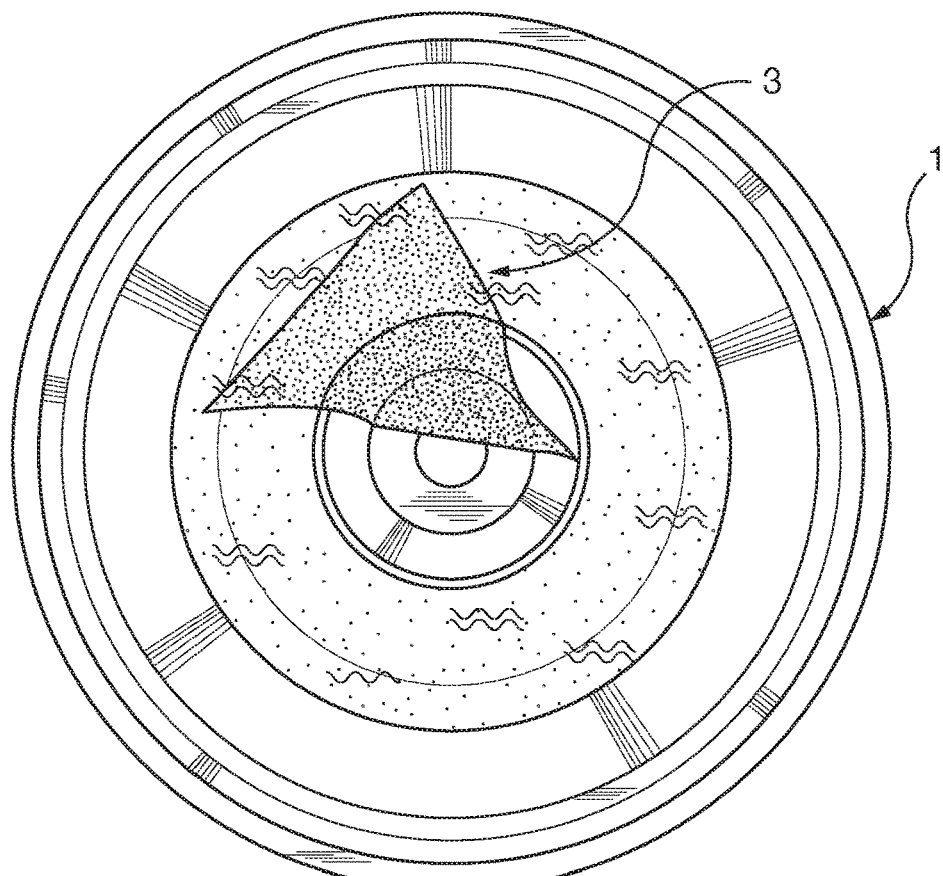

FIG. 7 is a top view of the outer pot of a preferred embodiment of the present invention with a wicking element placed in the bottom.

Figure 8:
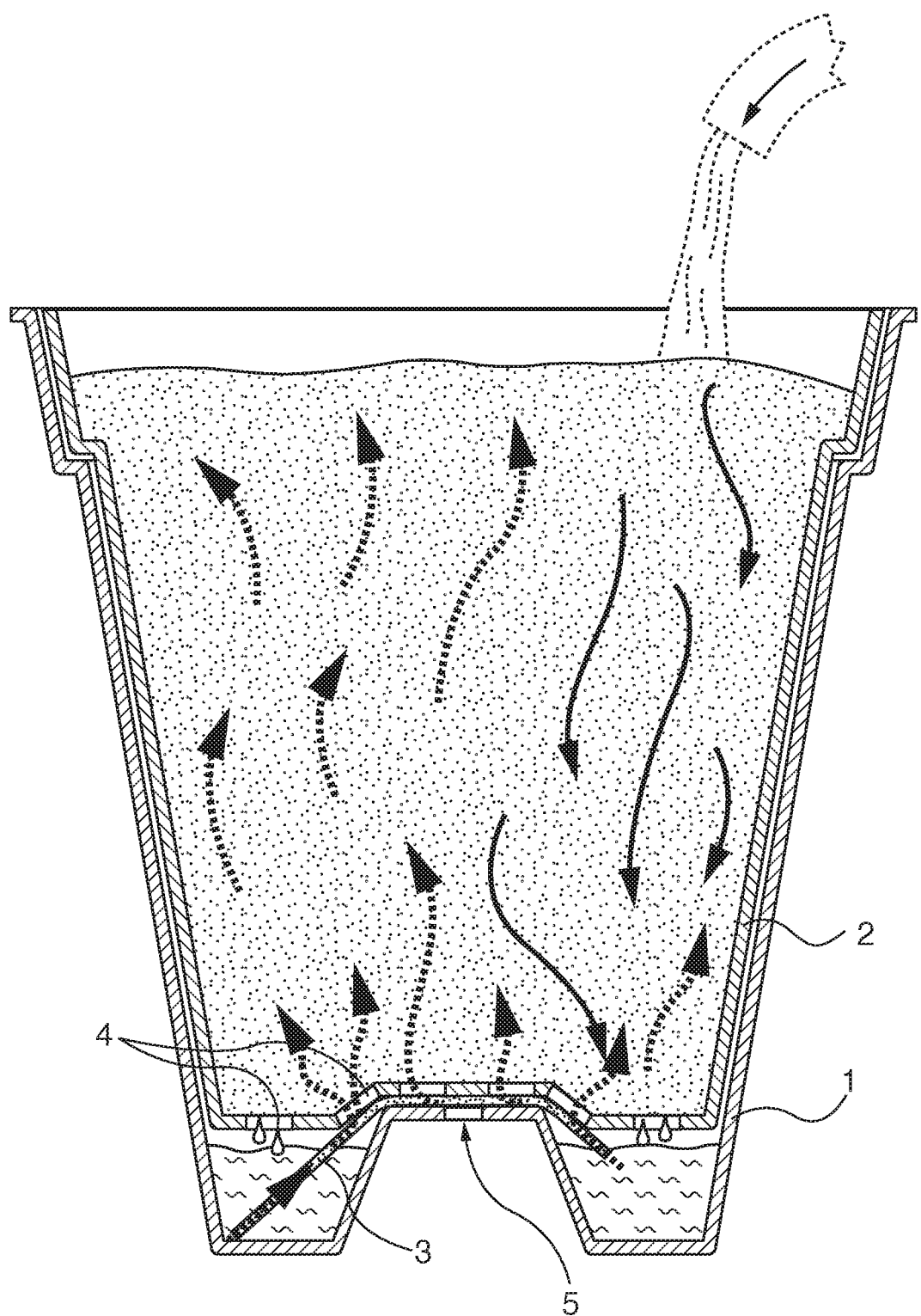

FIG. 8 is a cross sectional view of a preferred embodiment of the present invention.

Figure 9:
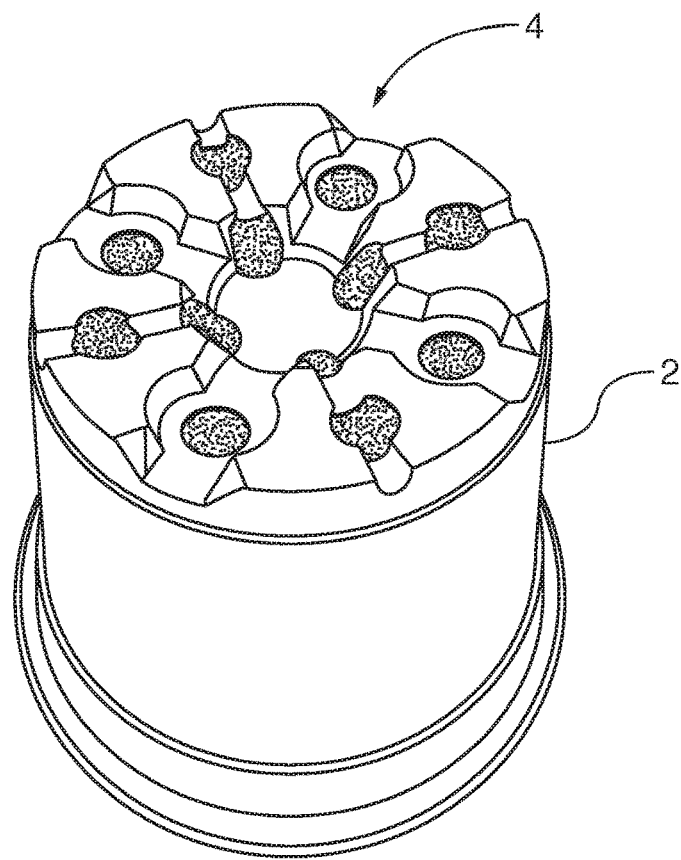

FIG. 9 is a bottom view of the inner pot of a preferred embodiment of the present invention.

Figure 10:
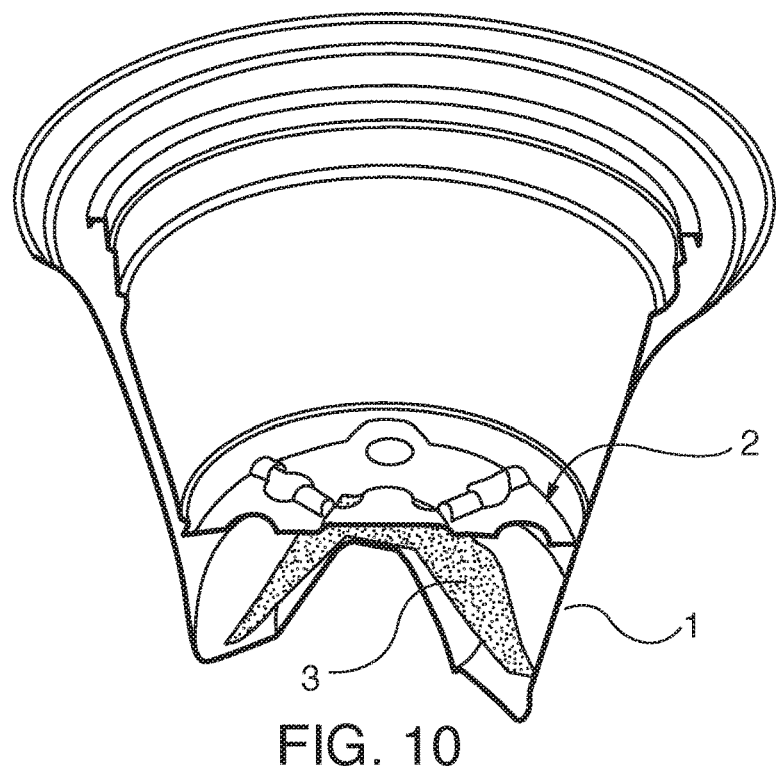

FIG. 10 is a cut away view of a preferred embodiment of the present invention.

Figure 11:
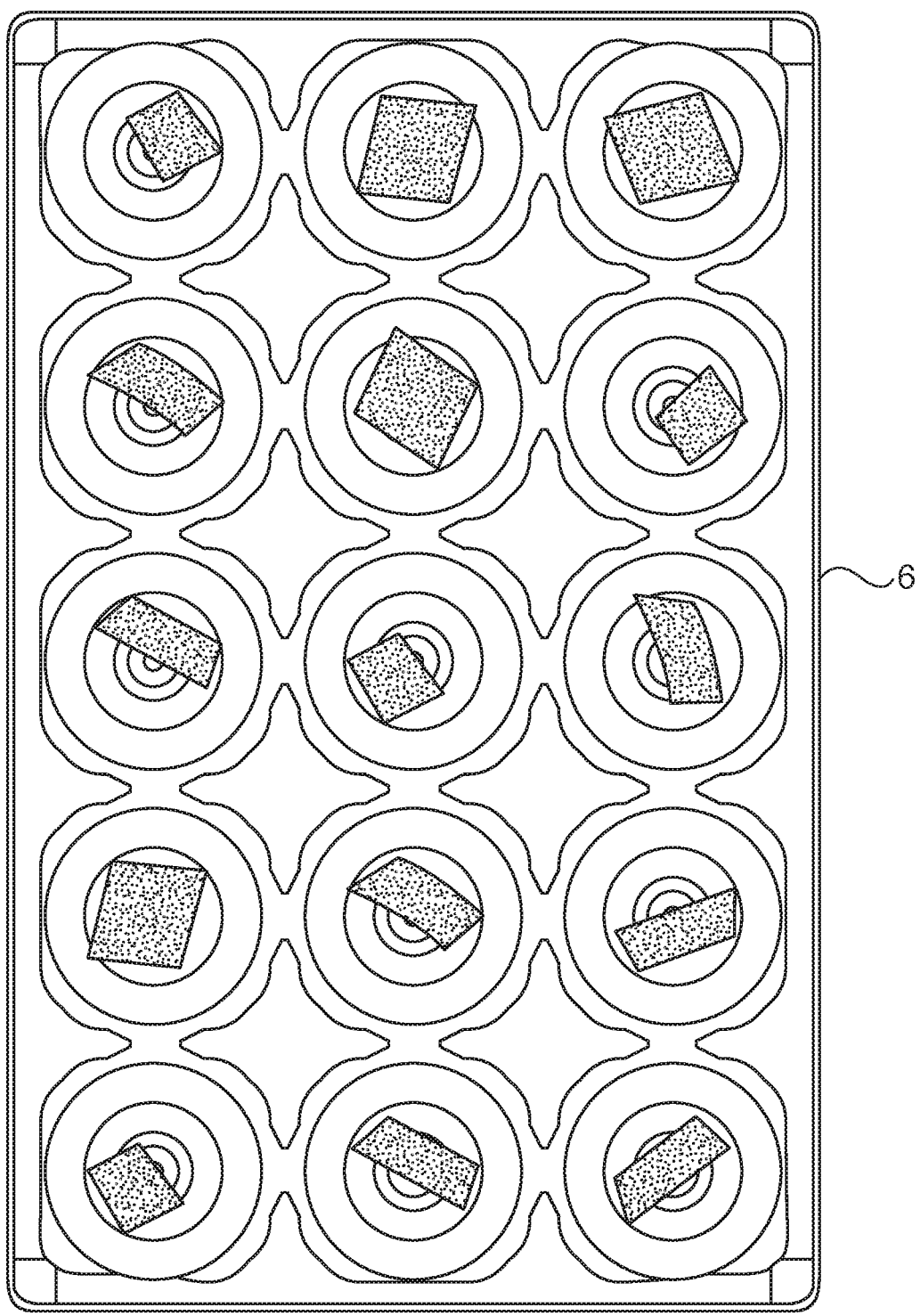

FIG. 11 is a top view of the outer inserts for a shipping tray-grower tray for potted plants with wicking elements inserted.

Figure 12:
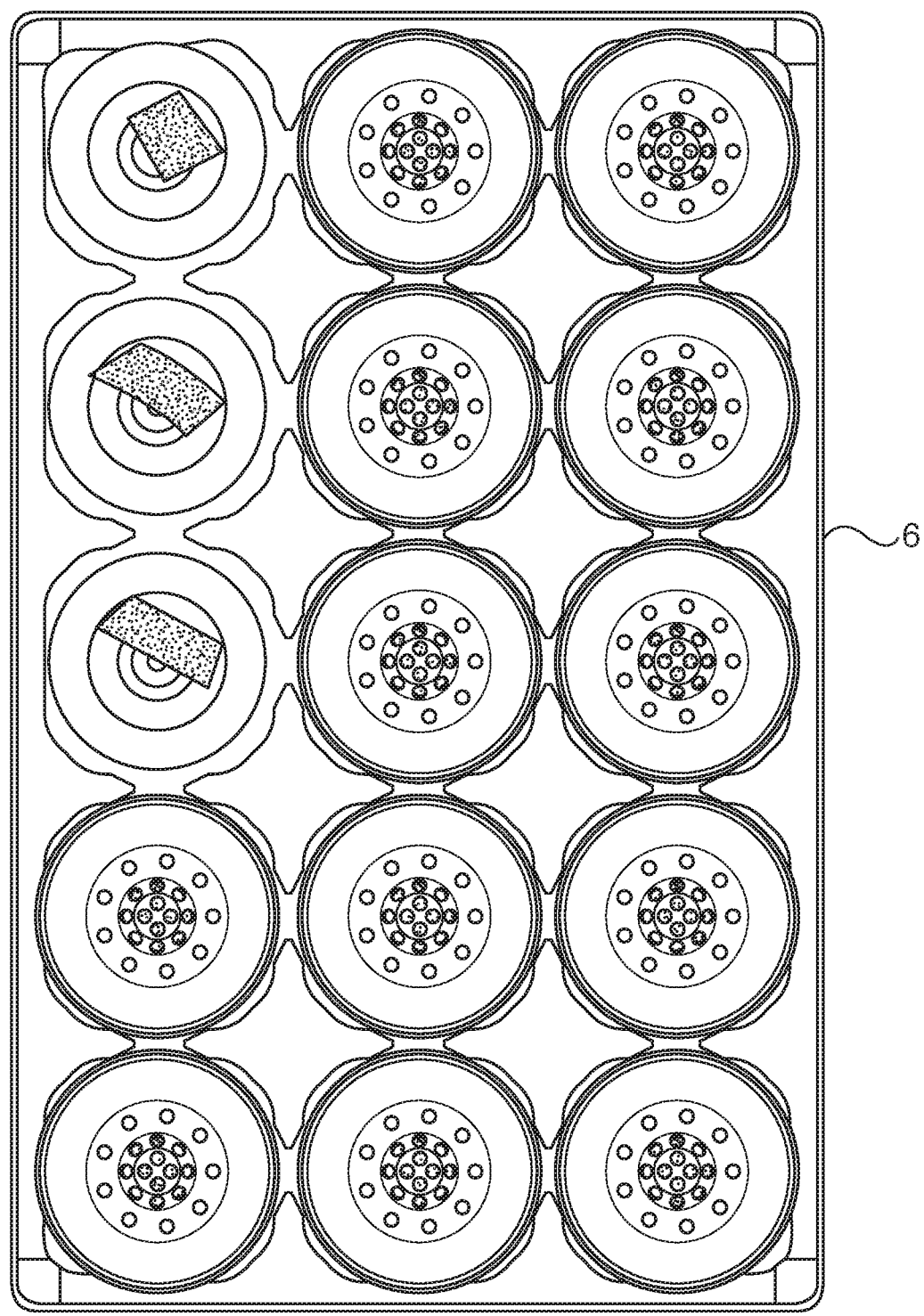

FIG. 12 is a top view showing the molded pockets in a shipping tray-grower tray with wicking elements inserted and that same tray with inner pots outer inserted.

Figure 13:
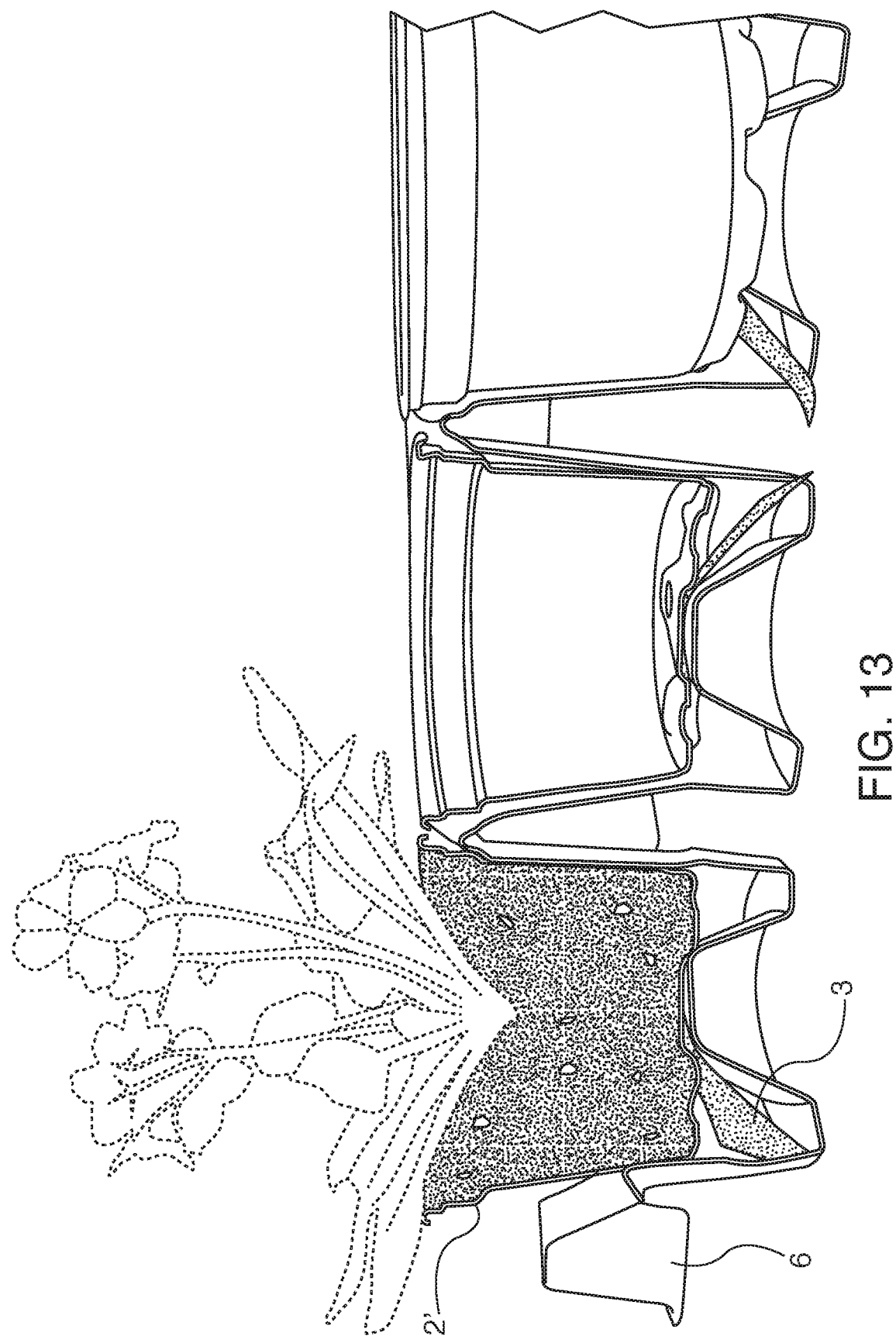

FIG. 13 are partial cut away views of inner grower pots inserted into a shipping tray-grower tray.

Figure 14:
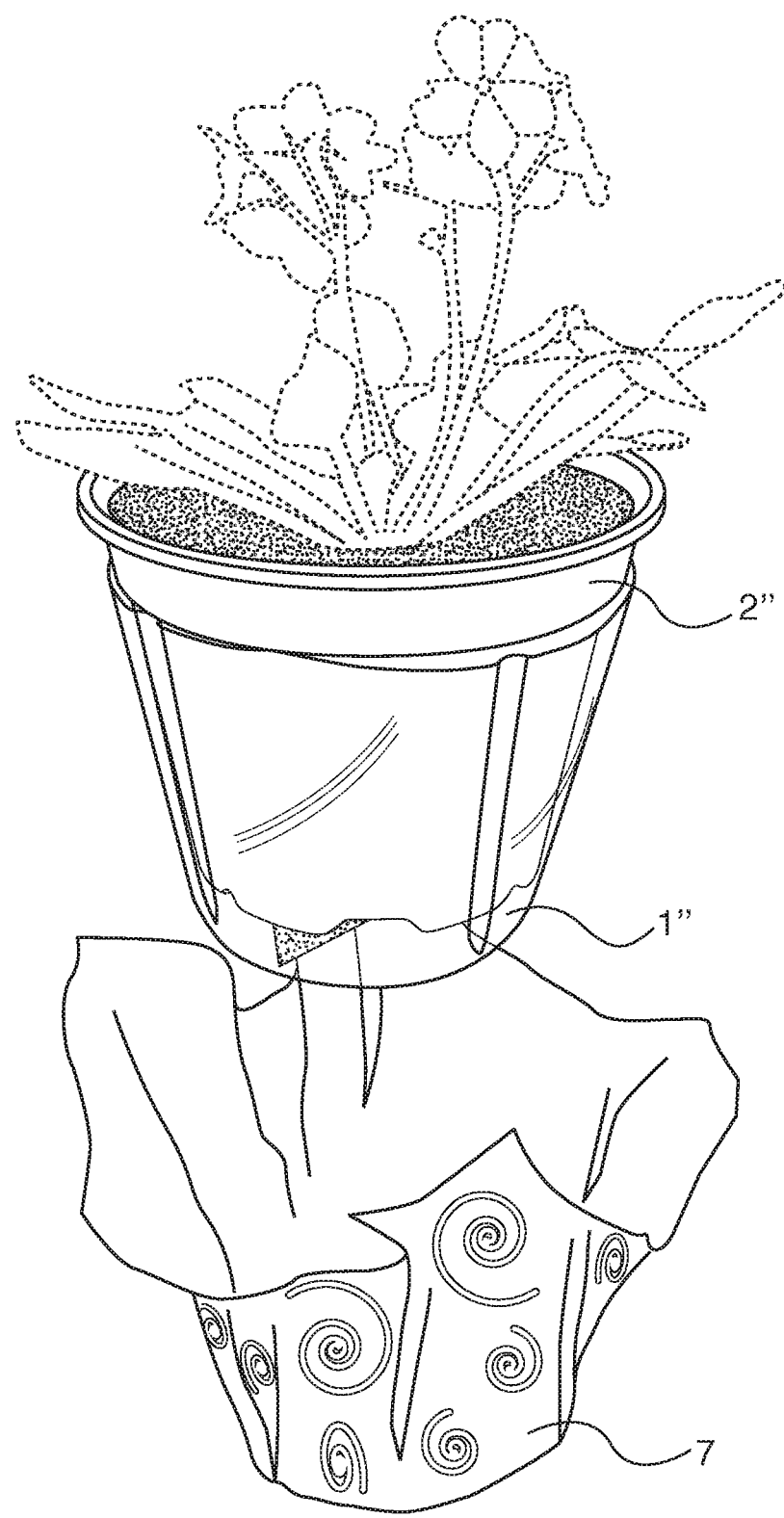

FIG. 14 is an isometric assembly view of a preferred embodiment of the present invention.

Figure 15:

FIG. 15 is an isometric view of a preferred embodiment of the present invention.

DETAILED DESCRIPTION OF INVENTION

The present invention will now be described in terms of the presently preferred embodiment thereof as illustrated in the drawings. Those of ordinary skill in the art will recognize that many obvious modifications may be made thereto without departing from the spirit or scope of the present invention.

In a preferred embodiment of the present invention, an outer container (often decorative) or pot is provided 1 (FIG. 1) with a center protrusion (FIG. 2) located in its bottom surface into which an inner container 2 (often referred to as a grower pot) containing soil and a plant or flower is placed. The inner container 2 has a center indentation (FIG. 2) in its bottom surface into which the center protrusion of the outer container 1 fits.

Figure 1:
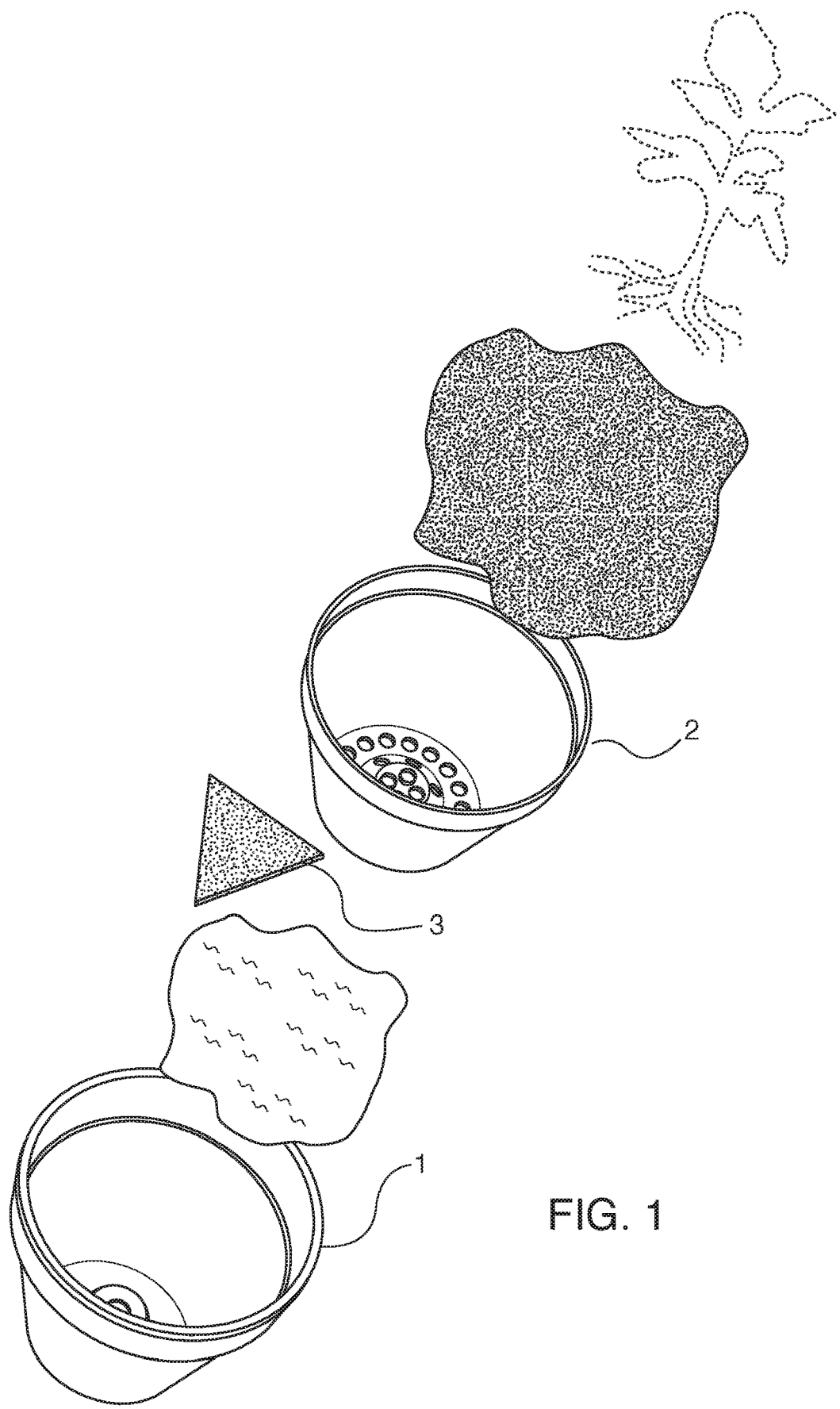
FIG. 1 is an isometric exploded view of a preferred embodiment of the present invention.
Figure 2:
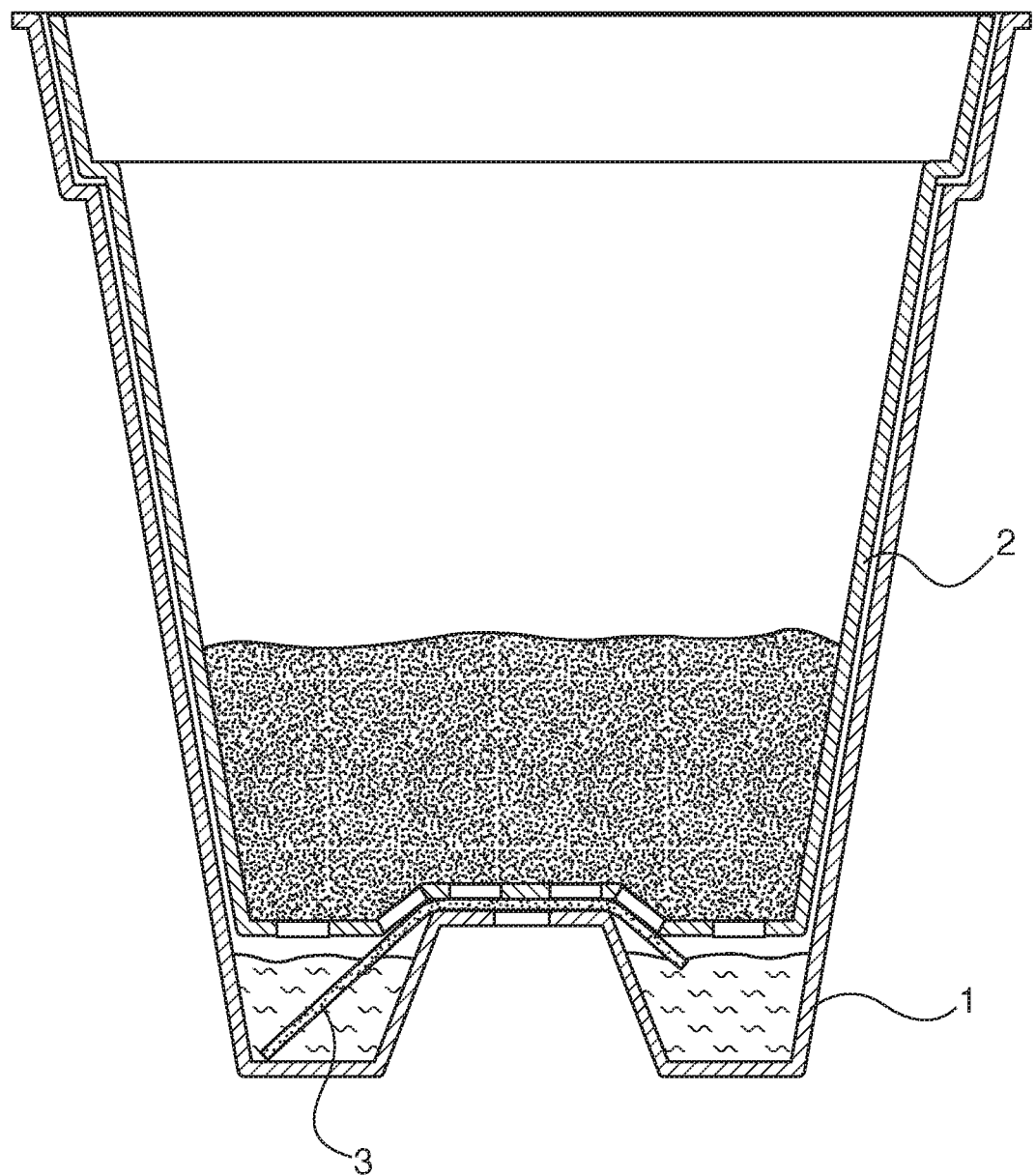
FIG. 2 is a cross sectional view of a preferred embodiment of the present invention.

Inserted into the base of the outer container 1 before the inner container 2 is inserted is a wicking element 3. FIG. 1 and FIG. 2. The wicking element is made from synthetic and cellulose fibers treated with a chemical binder which exhibits good dimensional stability, absorption and can be obtained in large quantities at minimal cost and easily cut into the desired shapes like Freudenberg Performance Materials item #765. Of course, any other materials which exhibit these traits and others can be used without altering the inventive concept of the present invention.

Further, various shapes and sizes of wicking material can be used and achieve the same effect as the triangular shape show in FIG. 1. The triangular shape exhibits three points and ease of manufacturing and as such forms one preferred embodiment of wicking element geometry. However, virtually any shape of wicking element will work as intended in the present invention without altering the inventive concept of the present invention including a closed polygon, circle or ellipse. FIGS. 6A, 6B, 6C and 6D.

The indention in the inner container 1 rests on the protrusion in the outer container 2 in such a way as to physically compromise the wicking element 3 where the wicking element 3 curves downward into the outer container 1 where water poured into the plant collects. FIG. 2. The natural orientation and shape of the wicking element 3 is flat, so the mating of the bottoms of the outer container 1 and the inner container 2 causes the wicking material to alter its shape. FIG. 2. In this altered configuration, the ends of the wicking element 3 make contact with the water stored in the volume created by the bottom surface of the inner container 2 and the bottom surface of the outer container 1. FIG. 2. When the ends of the wicking element 3 make contact with the water in this way, it allows for the water to wick through the wicking element 3 into the soil in the inner container 2.

Figure 4A:
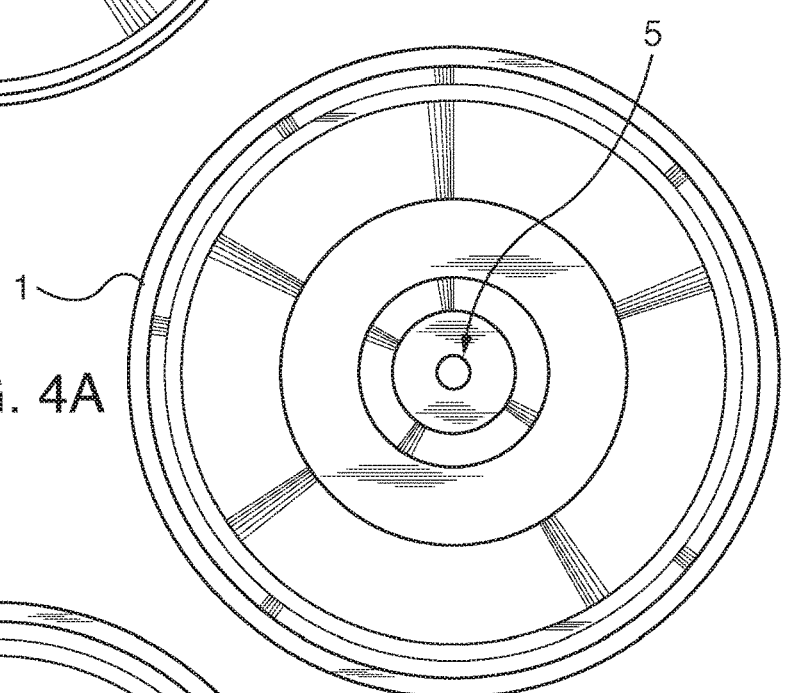
FIG. 4A is a top view of the outer pot of a preferred embodiment of the present invention.
Figure 4B:
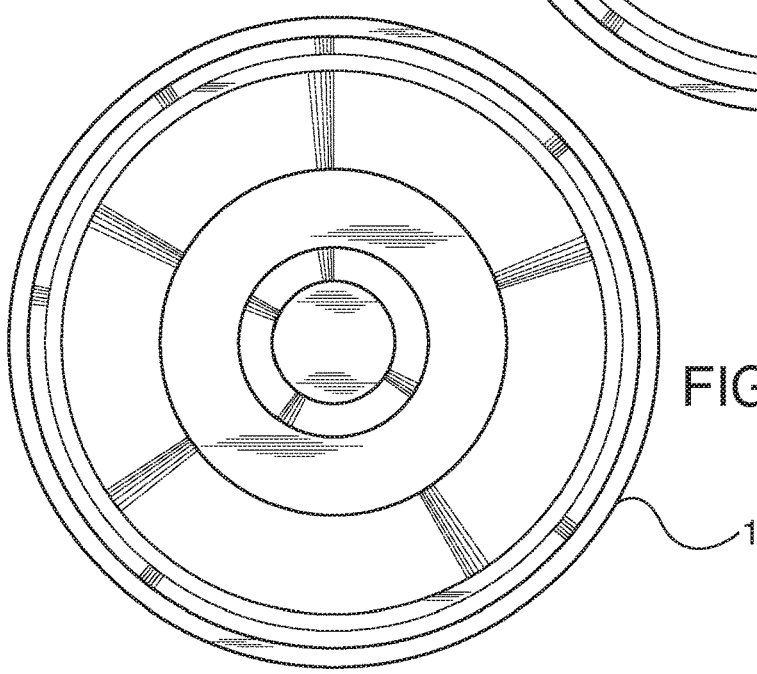
FIG. 4B is a top view of the outer pot of a preferred embodiment of the present invention.

The outer container 1 is presented in one preferred embodiment as having a hole 5 at the top of the central protrusion in its bottom surface. FIG. 4A. In an alternative preferred embodiment, the hole is removed from the outer container 1. FIG. 4B. The hole 5 in the outer container provides a passage for excess water accumulating in the volume created by the bottom surfaces of the inner and outer containers when the inner container is seated on top of the outer container during watering.

Figure 5:
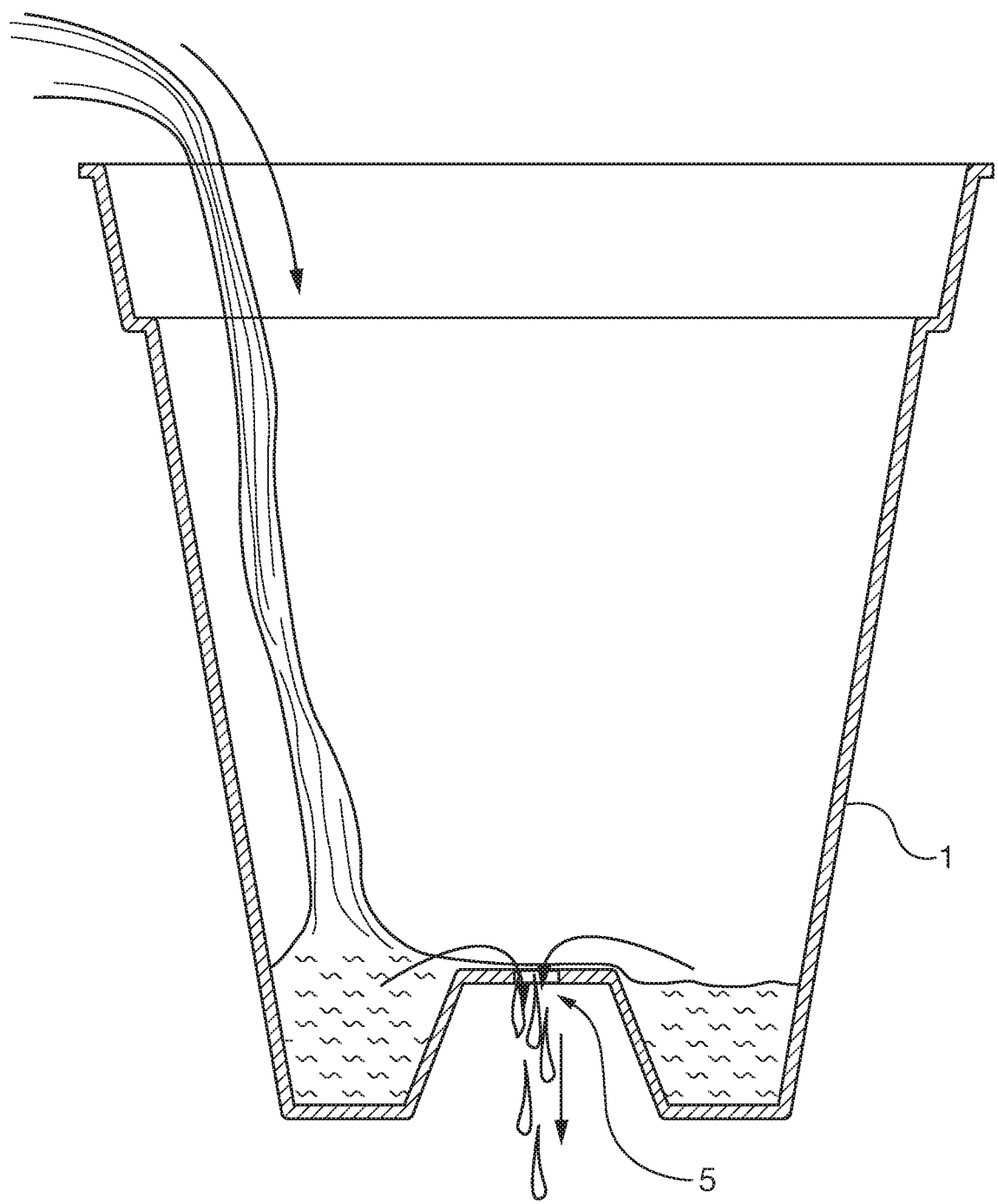
FIG. 5 is a cross sectional view of the outer pot of a preferred embodiment of the present invention.

Specifically, it is one objective of the present invention to allow for the overwatering of a plant in the inner container. So, to facilitate that likely eventuality, the excess water would accumulate in the outer container 1 and when it rises to the level of the hole 5 in the outer container 1, the water would drip out. FIG. 5. In this way, water accumulated in the volume between the bottom surfaces of the inner container 2 and outer container 1 would be used to hydrate the plant/flower in the inner container 2 through the wicking element 3. FIG. 8. Additionally, this accumulated water would also drip out through the hole 5 in the outer container 1 so that excess water does not over saturate the soil in the inner container 2 when the wicking process has already sufficiently hydrated the soil.

In the alternative embodiment of the outer container 1 where hole 5 is removed to account for the circumstance when a wholesaler or more likely a retailer of plants and flowers using the present invention does not want water leakage from the outer container. This could be to guard against the possibility of injury or simply the esthetic value of not having puddles of water on the ground. In this embodiment, the inner container 2 and outer container 1 with the wicking element 3 placed between their bottom surfaces would function as described without the ability to have water drain out of the outer container 1 due to overwatering.

Figure 3:
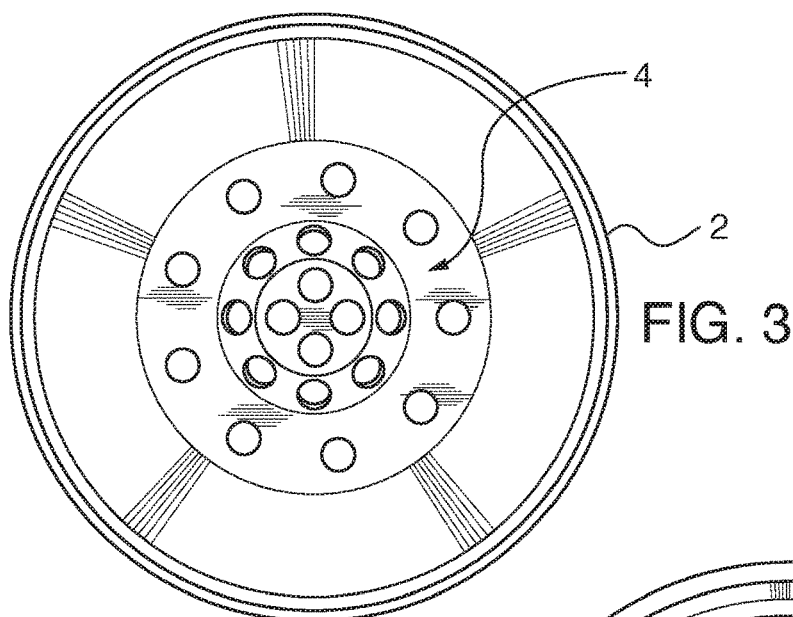
FIG. 3 is a top view of the inner pot of a preferred embodiment of the present invention.

In a preferred embodiment, the inner container 2 has a plurality of holes in its bottom surface 4 to allow for access to hydration form the wicking element 3. FIG. 1, FIG. 3. However, an alternative embodiment exists where the inner container 2 has a single hole in the center of the center indentation in its bottom surface 4. In this embodiment, the wicking element 3 would transfer moisture from the water in the outer container 1 to the soil in the inner container 2 more slowly through the single hole.

The wicking element 3 becomes saturated from the water accumulated at the bottom of the outer container 1. FIG. 2 and FIG. 8. But the moisture from the wicking element 3 only transfers moisture into the soil in the inner container 2 when that soil is dehydrated and will not transfer moisture to the soil when the soil is hydrated. In this way, the wicking element 3 works to meter the flow of hydration to the soil and prevents over hydration of the soil and therefore the plant or flower in the inner container 1. FIG. 8.

It is the design concept of the present invention to provide an inexpensive and easily implemented system for hydrating flowers and plants in transport from wholesalers to retailers and on sale to consumers in retail stores and outlets. Specifically, the present invention provides for an easily molded plastic inner container 2 with a bottom surface center protrusion and similarly easily molded outer container 1 with a bottom surface center indentation. An inexpensive and readily available wicking element 3 is haphazardly placed into the bottom of the outer container 1. FIG. 7. The inner container 2 is then inserted into the outer container where the center protrusion of the outer container 1 fits into the center indentation of the inner container 2 in such a way as to physically compromise the wicking element 3 and point its ends down toward the bottom container 1. FIG. 1.

Water is then added to the plant/flower in the inner container 2. FIG. 8. The water percolates through and into the soil and also passes through the natural voids and gaps in the soil. The excess water from the percolating and passing through processes naturally settles into the volume formed between the inner container 2 and the outer container 1. FIG. 8. Here, the wicking element 3 ends submerged into the water in this volume (FIG. 8) draws the water and wicks it into the soil in the inner container 2 by means of the holes in the inner container 2. FIG. 2, FIG. 8 and FIG. 13. In one preferred embodiment, excess water rising to the level of a hole in the outer container 1 is dribbled out. FIG. 5 and FIG. 8.

In another preferred embodiment of the present invention, the central protrusion of the outer container is molded or otherwise fabricated into the circular inserts of a standard shipping tray-grower tray 6 used to transport plants and flowers and to display them for retail sale. FIG. 11. Wicking elements are inserted into the bottom of the molded circular inserts in the standard shipping tray-grower tray 6. FIG. 11 and FIG. 13. Inner containers 2' are inserted into the molded circular inserts with the wicking elements 3 already in place. FIG. 12 and FIG. 13.

Again, here, water is added to the plant/flower in the inner containers 2' of the shipping tray-grower tray 6. FIG. 8. The water percolates through and into the soil and also passes through the natural voids and gaps in the soil. The excess water from the percolating and passing through processes naturally settles into the volume formed between the inner container 2' and the molded outer container 6. FIG. 8 and FIG. 13. Here, the wicking element 3 ends submerged into the water in this volume (FIG. 8) draws the water and wicks it into the soil in the inner container 2' by means of the holes in the inner container 2'. FIG. 2, FIG. 8 and FIG. 18. In one preferred embodiment where a center hole 5 is present in the molded circular inserts of the shipping tray-grower tray 6, excess water rising to the level of a hole in the molded outer container 6 is dribbled out. FIG. 5 and FIG. 8.

In yet another preferred embodiment of the present invention, the outer container is in the form of an outer insert 1" that is surrounded by a decorative covering 7. The decorative covering 7 can be cellophane wrap, foil wrap or any other similar type standard plant pot covering. Often these coverings are decorative and seasonally appropriate. FIG. 15. A Wicking element 3 is inserted into the bottom of the outer insert 1". FIG. 11 and FIG. 13. Inner container 2" is inserted into the outer insert 1" with the wicking element 3 already in place. FIG. 12, FIG. 13 and FIG. 14.

Again, here, water is added to the plant/flower in the inner container 2". FIG. 8, FIG. 14. The water percolates through and into the soil and also passes through the natural voids and gaps in the soil. The excess water from the percolating and passing through processes naturally settles into the volume formed between the inner container 2" and the outer insert 1". FIG. 8 and FIG. 14. Here, the wicking element 3 ends submerged into the water in this volume (FIG. 8) draws the water and wicks it into the soil in the inner container 2" by means of the holes in the inner container 2". FIG. 2, FIG. 8. In one preferred embodiment where a center hole 5 is present in the outer insert 1", excess water rising to the level of a hole in the outer insert 1" is dribbled out. FIG. 5 and FIG. 8.

Those of ordinary skill in the art will recognize that the embodiments just described merely illustrate the principals of the present invention. Many obvious modifications may be made thereto without departing from the spirit or scope of the invention as set forth in the appended claims.

The invention claimed is:

1. A wick watering system for potted plants comprising:
   an outer container with a side surface and a bottom surface, wherein the bottom surface has a central protrusion extending into an interior space of the outer container;
   an inner container placed into the interior space of the outer container, the inner container having a side surface and a bottom surface, wherein the side surface of the inner container does not contain any holes, and wherein the bottom surface of the inner container has a central indentation, wherein the central indentation is configured and disposed to rest on the central protrusion of the outer container, and wherein the inner container has a plurality of holes formed within the central indentation in its bottom surface;
   wherein a hole is formed at a tip of the central protrusion of the outer container; and
   a wicking element inserted between the outer container and the inner container and wherein the wicking element is in communication with the plurality of holes formed within the central indentation.

2. The wick watering system for potted plants of claim 1 wherein the shape of the wicking element is a polygon.

3. The wick watering system for potted plants of claim 1 wherein the shape of the wicking element is generally circular.

4. The wick watering system for potted plants of claim 1 wherein the shape of the wicking element is generally elliptical.

5. The wick watering system of claim 1, wherein a top surface of the inner container is aligned with a top surface of the outer container when the inner container is installed in the outer container.

6. The wick watering system for potted plants of claim 5 wherein the shape of the wicking element is a polygon.

7. The wick watering system for potted plants of claim 5 wherein the shape of the wicking element is generally circular.

8. The wick watering system for potted plants of claim 5 wherein the shape of the wicking element is generally elliptical.

* * * * *